United States Patent [19]
Hulsing, II

[11] Patent Number: 5,886,259
[45] Date of Patent: *Mar. 23, 1999

[54] AXIS ALIGNED RATE AND ACCELERATION SENSOR

[75] Inventor: Rand H. Hulsing, II, Redmond, Wash.

[73] Assignee: AlliedSignal Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 626,306

[22] Filed: Apr. 1, 1996

[51] Int. Cl.$^6$ ........................................... G01P 3/00
[52] U.S. Cl. ..................... 73/504.12; 73/504.03; 73/510; 73/514.38
[58] Field of Search ............................ 73/504.04, 514.38, 73/514.18, 514.29, 504.12, 510, 504.02, 514.37

[56] References Cited

U.S. PATENT DOCUMENTS

| | | | |
|---|---|---|---|
| 4,665,748 | 5/1987 | Peters | 73/505 |
| 4,750,364 | 6/1988 | Kawamura et al. | 73/510 |
| 4,799,385 | 1/1989 | Hulsing et al. | 73/505 |
| 5,005,413 | 4/1991 | Novack et al. | 73/514.38 |
| 5,241,861 | 9/1993 | Hulsing | 73/505 |
| 5,319,976 | 6/1994 | Hulsing | 73/505 |
| 5,331,853 | 7/1994 | Hulsing | 73/505 |
| 5,341,682 | 8/1994 | Hulsing | 73/505 |
| 5,456,110 | 10/1995 | Hulsing, II | 73/514.38 |

*Primary Examiner*—Christine K. Oda

[57] ABSTRACT

An angular rate sensor that utilizes the Coriolis effect and which includes two dithered accelerometers having proof masses suspended by a hinge fabricated out of a Silicon substrate, the proof masses are provided with support struts that can be adjusted by applying heat to the struts to compensate for misalignment of the proof masses along the dither axis. In one embodiment, the hinges are located on the same side of the substrate and a vibrating beam force transducers are connected between each of the proof masses and associated accelerometer frames in a push-pull arrangement.

40 Claims, 3 Drawing Sheets

AXIS ALIGNED RATE AND ACCELERATION SENSOR

FIELD OF INVENTION

The invention relates to the field of angular rate sensors that utilize the Coriolis acceleration effect to measure the angular rate of rotation of the sensor and in particular to such angular rate sensors that include a pair of accelerometers fabricated out of a substrate.

BACKGROUND OF THE INVENTION

In order to provide relatively low cost, inertial grade sensors for measuring angular rate of rotation as well as linear acceleration, sensors have been developed that include a pair of accelerometers and their mounting structure fabricated out of a monolithic planar substrate. The accelerometers can then be dithered along the plane of the substrate so that the output signals of the accelerometers have a Coriolis component which can be used to measure angular rate of rotation. The accelerometers can also provide signals representing linear acceleration of the sensor in an axis normal to the plane of the substrate. Typically, the accelerometers and mounting structure are etched or micromachined out of a monolithic wafer of silicon. Examples of this type of sensor are described in U.S. Pat. Nos. 5,241,861, 5,319,976, 5,331,853, and 5,341,682 all of which are assigned to the assignee of this invention.

It has been discovered that small angular alignment errors, on the order of $100\mu$ radians, can occur due to accelerometer misalignment resulting from minute manufacturing tolerances and inherent deviations in wafer flatness. Since rate accuracy in this type of sensor is a function of full scale g-range, dither frequency and phase resolution, a $100\mu$ radian error in a sensor being dithered at 600 Hz can result in a bias uncertainty of 3 degrees per hour. One approach to solving this problem is described in U.S. Pat. Nos. 4,665,748 and 4,799,385, both of which are assigned to the assignee of this invention, where accelerometer misalignment is reduced by measuring the in-phase component of the dither signal and serving a parallelogram mechanism that supports the accelerometers. However, such a parallelogram accelerometer support mechanism is not practical in the type of sensor where the accelerometers are fabricated out of silicon wafer.

Also, the sensors described in U.S. Pat. Nos. 5,241,861, 5,319,976, 5,331,853, and 5,341,682 can be subject to cross-axis linear vibration sensitivity because the hinges supporting the proof masses of the accelerometers are located on opposite sides of the substrate.

SUMMARY OF THE INVENTION

According to one aspect of the present invention to provide a sensor, which includes at least one planer proof mass supported on a mounting structure by a suspension mechanism having a hinge that permits at least limited rotation of the proof mass with respect to a first axis where misalignment with a second axis normal to the first axis is corrected by applying an alignment force to the suspension mechanism to maintain the proof mass in planer alignment with the second axis. The suspension mechanism can include a strut opposite the hinge for generally maintaining the proof mass in a plane normal to both the first axis and the second axis and the alignment force can be applied by the strut to the proof mass by heating the strut to increase its length.

According to a further aspect of the invention to provide an angular rate sensor having two accelerometers, with planer proof masses supported by hinges and struts to accelerometer frames, configured out of a monolithic substrate where the accelerometers are dithered along a dither axis normal to the plane of the proof masses. Planer misalignment of the proof masses with respect to the dither axis is corrected by applying an alignment force to the proof masses through the struts. The alignment force is generated as a function of the dither frequency and the linear output signals of the accelerometers.

A further aspect of the invention to provide an angular rate sensor having two accelerometers, with planer proof masses supported by hinges and struts to accelerometer frames that in turn are connected to a mounting frame by support flexures, configured out of a monolithic substrate where the hinges are both located on the same side of the sensor. A vibrating beam force transducer is connected between each of the proof masses and the accelerometer frames and the accelerometer frames are dithered along an axis normal to the plane of the substrate. In one embodiment, each of the proof masses is attached to its accelerometer frame by two of the struts connected to the end of the proof mass opposite of the end attached to its hinge. Alignment of the proof masses along the dither axis can be provide by applying a force to the proof masses through said struts.

Still a further aspect of the invention to provide an angular rate sensor which has, secured within a support structure, a planer substrate fabricated to include: a mounting frame; first and second accelerometers each having proof masses located within accelerometer frames where the proof masses are attached at one end to each accelerometer frame with a hinge and at the other end of the proof mass with at least one strut; a force sensing transducer connecting one side of each proof mass to one side of each accelerometer frame in a push-pull arrangement; and flexures connecting each of the accelerometer frames to the mounting frame. The sensor also includes a dither mechanism for dithering the accelerometers along a dither axis and a processor responsive to the signal outputs of the vibrating beams and the dither mechanism to provide an angular rate signal. The outputs of the force sensing transducers can also be used to provide an acceleration signal representing acceleration of the sensor along a force axis normal to the plane of the substrate. In one configuration, both of the hinges are located along one side of the mounting frame and two struts parallel to the dither axis are used to connect the proof masses to the accelerometer frames. Planer misalignment of the proof masses with respect to the dither axis can be corrected by lengthening one or the other of the struts attached to each proof mass.

DETAILED DESCRIPTION OF THE INVENTION

Figure 1:
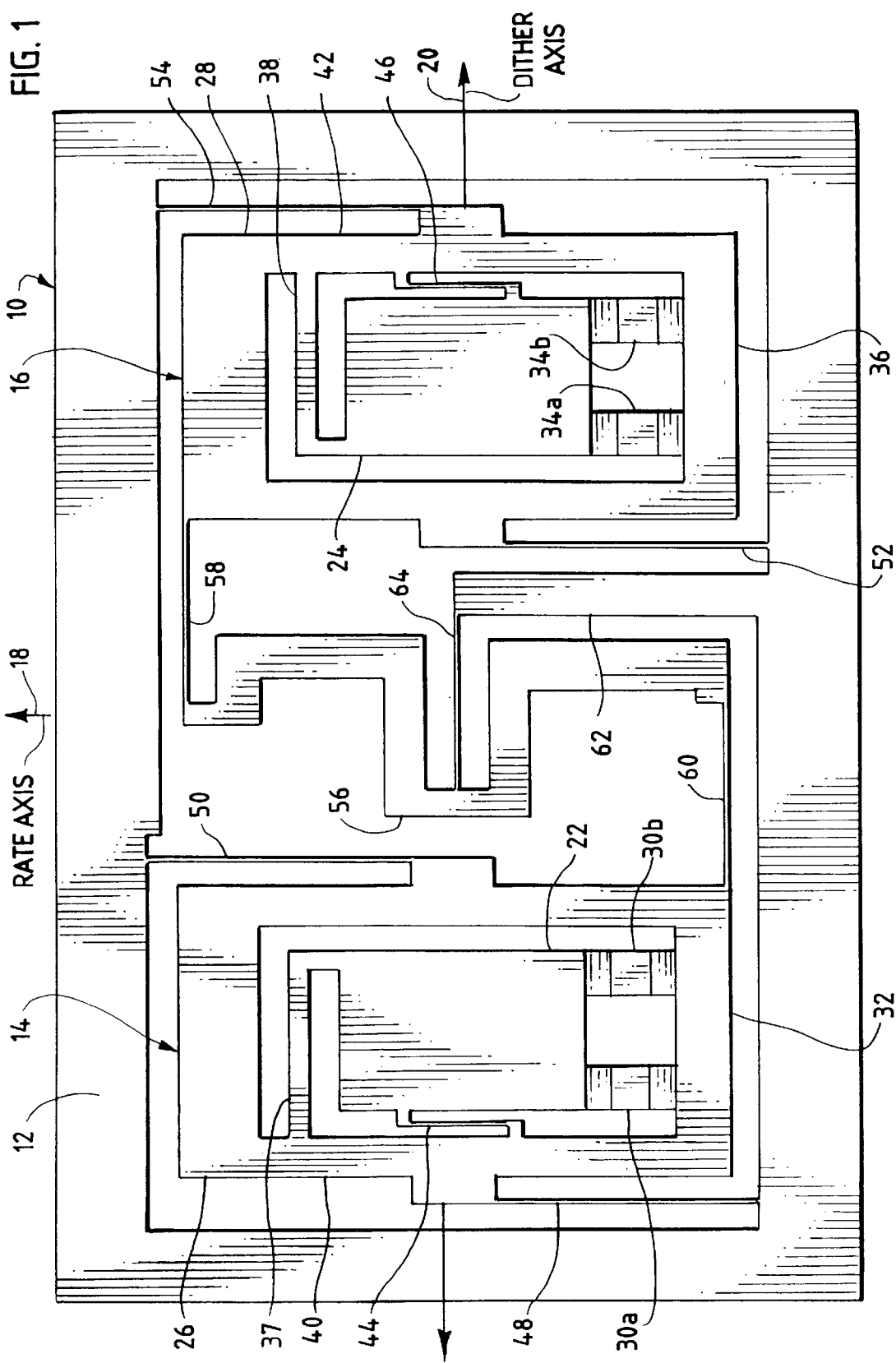
FIG. 1 is a top plan view of the substrate of a first embodiment of the invention.

FIG. 1 provides a top view of a substrate 10 of a first embodiment of the invention. The configuration and operation of the substrate 10 is generally similar to the substrates used in the rate and acceleration sensors shown in U.S. Pat. Nos. 5,241,861, 5,319,976, 5,331,853, and 5,341,682 the descriptions of which are incorporated herein by reference. Fabricated out of the substrate 10 is a rectangularly shaped mounting frame 12 enclosing a pair of accelerometers 14 and 16 which in turn are located on each side of an angular rate axis 18. A dither axis 20 extends transversely across the substrate 10 normal to the rate axis 18. Each of the accelerometers 14 and 16 includes a rectangularly shaped proof mass 22 and 24 enclosed within a generally rectangularly shaped accelerometer frame 26 and 28. A first hinge 30 which includes a pair of hinge flexures 30a and 30b connects the lower end of the first proof mass 22 to a lower end 32 of the first accelerometer frame 26 and a second hinge 34 which includes a pair of hinge flexures 34a and 34b connects the lower end of the second proof mass 24 to a lower end 36 of the second accelerometer frame 28. Completing the suspension of the proof masses 22 and 24 in the accelerometer frames 26 and 28 are a pair of struts 37 and 38 that connect the upper ends of the proof masses 22 and 24, at their inner sides, to an outer side 40 and 42 of their respective accelerometer frames 26 and 28.

In order to measure the amount of angular rotation of the proof masses 22 and 24 in response to acceleration along a force sensing axis normal to the plane of the substrate 10, a pair of force detecting transducers 44 and 46 of the dual vibrating beam type, as more fully described in the above referenced patents as well as U.S. Pat. Nos. 5,005,413 and 5,456,110, are connect between the outer sides 40 and 42 of the accelerometer frames 26 and 28 and the outer sides of their respective proof masses 22 and 24. Preferably, the vibrating beam transducers 44 and 46 are attached to the upper surface of the accelerometer frames 26 and 28 and the proof masses 22 and 24. By connecting the force transducers 44 and 46 as shown in FIG. 1 with the first transducer 44 connected to the upper portion of the proof mass 22 and the second transducer 46 connected to the lower portion of the proof mass 24, the transducers 44 and 46 can operate in a push-pull manner. In the push-pull operation, one of the transducers 44 or 46 is subjected to a compression force along its longitudinal axis, which is parallel to the rate axis 18, while the other of the transducers 44 or 46 is subjected to compression along its longitudinal axis when the substrate 10 and hence the proof masses 22 and 24 are accelerated in one direction along the force sensing axis. Also, it should be noted, that by connecting the transducers 44 and 46 to the sides of the acceleration frames 26 and 28, fabrication of the substrate 10 is facilitated.

The first accelerometer frame 26 is connected to the mounting frame 12 by a pair of frame flexures 48 and 50 and the second accelerometer frame 28 is connected to the mounting frame 12 by a another pair of frame flexures 52 and 54. A link 56 is connected to the accelerometer frames 26 and 28 by a pair of link flexures 58 and 60 as well as being connected to a central link mounting member 62 by a flexure 64. The function of the link member 56 is the same as the link described in the U.S. Pat. Nos. 5,241,861, 5,319,976, 5,331,853, and 5,341,682 which is to interconnect the first and second accelerometers 14 and 16 so that any motion applied to one of the accelerometers 14 or 16 will equally be applied to the other of the accelerometer. The link 56 will thus serve to insure that when the accelerometers 14 and 16 are dithered they will be dithered in phase and at the same amplitude. Preferably, the relative dimensions of the substrate 10 and its various components shown in FIG. 1 are the same as in the substrates described in the above referenced patents.

Operation of the sensor substrate 10 is fundamentally the same as the operation of the sensors described in the U.S. Pat. Nos. 5,241,861, 5,319,976, 5,331,853, and 5,341,682 in that the accelerometers 14 and 16 are dithered in opposite directions along the dither axis 20. The signal outputs of the force transducers 44 and 46 can then be combined in a processor (not shown) to generate an angular rate signal, utilizing the Coriolis acceleration effect. The angular rate signal represents the angular rate of rotation of the sensor substrate 10 around the rate axis 18. The processor also generates a signal representing linear acceleration along the force sensing axis. As in the sensors described in the above cited patents, a sensor support structure (not shown), in addition to providing support for the mounting frame 12, can provide a source of magnetic flux to facilitate dithering of the accelerometers 14 and 16. It should be noted, however, that equivalent forms of dithering can be used with the general type of sensor shown in FIG. 1 including capacitive dithering.

One of the advantages of the sensor substrate 10 shown in FIG. 1 is that by locating the hinges 30 and 34 on the same side of the mounting frame 12 or substrate 10, cross-axis linear acceleration can be eliminated from the rate channel.

In the preferred embodiment of the invention the substrate 10 fabricated or etched from a planer silicon wafer, however, it should be understood that other materials such as quartz can be used for the substrate 10.

Figure 2:
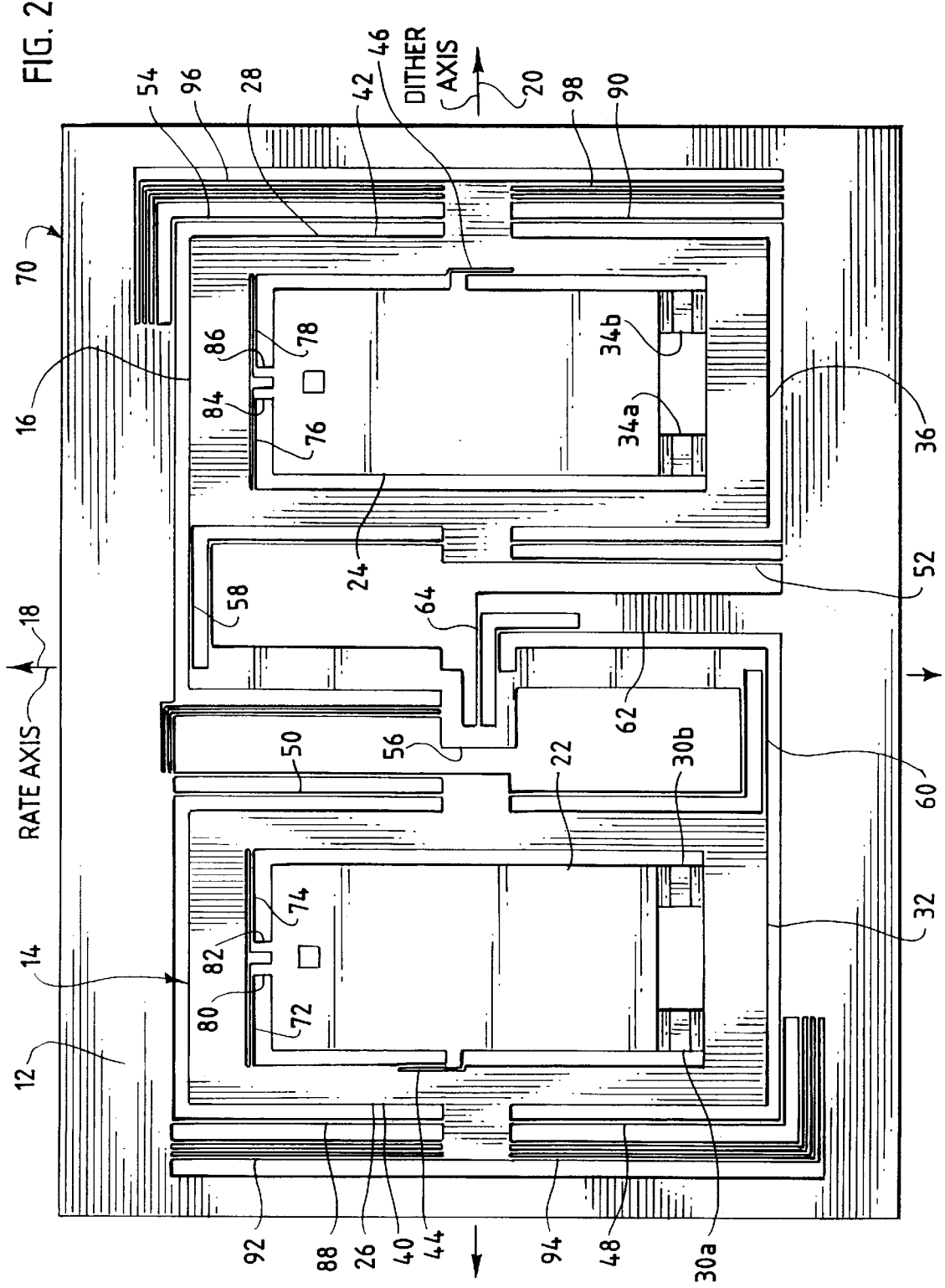
FIG. 2 is a top plan view of the substrate of a second embodiment of the invention.

FIG. 2 provides an illustration of a second embodiment of the invention. In this embodiment, a substrate 70 has the same general configuration as the substrate 10 of FIG. 1 with like components having the same reference numerals. One significant difference between the substrate 70 and substrate 10 is that the single struts 37 and 38 are replaced by a first pair of struts 72 and 74 connecting the end of the proof mass 22 to the accelerometer frame 26 and a second pair of struts 76 and 78 connecting the end of proof mass 24 to the accelerometer frame 28. Here, the struts 72 and 74 are attached to a pair of projections 80 and 82 extending from near the center of the top of the proof mass 22 away from hinge 30 and extend parallel to the dither axis 20 to each side of the accelerometer frame 26. Similarly, the struts 76 and 78 extend from a pair of projections 84 and 86 parallel to the dither axis 29 to each side of the accelerometer frame 28.

The substrate 70, as shown in FIG. 2, includes an additional pair of frame flexures 88 and 90 connecting the first and second accelerometer frames 26 and 28 to the mounting frame 12. In addition to the dither frame flexures 48–54, 88 and 90, the substrate contains four sets of three epitaxial frame flexures, indicated by 92–98. These epitaxial frame flexures 92–98, while adding only about 4% to the frequency of the accelerometer dither, provide additional conductive paths for the dither drive, the dither pickoff and various other components on the substrate 70 which are therefore more easily fabricated on one side of the substrate wafer.

Another feature of the substrate 70 is the ability to correct planer misalignment or tilting of the proof masses 22 and 24 with respect to the plane of the substrate 70 along the dither axis 20. Due to minute manufacturing tolerances and variations in wafer flatness, such torsional misalignments of the plane of the upper surface of the proof masses 22 or 24 on the order of 100μ radians can occur. To correct this misalignment, a torqueing or alignment force can be applied to the proof masses 22 and 24 via the struts 72–78. Taking the first accelerometer 14 as an example, heat can be applied to one of the struts 72 or 74 thereby increasing its length and at the same time having the effect of compressing the other strut. Thus, an alignment torque or force is applied to the proof mass 22 by linear expansion/contraction of the struts 72 and 74 in a plane normal to the substrate 70. Because the struts 72 and 74 are preferably formed of a relatively thin epitaxial layer attached to the upper surface of the proof mass 22 by projections 80 and 82, the struts 72 and 74 will produce a moment arm length equal to the thickness of the substrate 70 and minus the thickness of the struts 72 and 74. As an example in the substrate 70 shown in FIG. 2, by applying a 6 volt drive signal at ⅓ of a milliamp through an epitaxial layer having a 20 kΩ resistance to one of the struts 72–78, where the strut has a length of 2.3 mm, a width of 70 mm, and a thickness of 29 mm, will result in an approximate 5 degree C. increase in the temperature in the strut. This temperature increase could correct a 15$\mu$ radian misalignment of the proof mass 22 or 24.

As a preferred embodiment, it would be desirable to directly deposit a nickel-chromium layer on the struts 72–78 to form resistor heating elements. An advantage of Ni-Cr is that it provides a high resistivity, low temperature coefficient resistor. For example, a Ni-Cr resistor value of 1 kΩ can be achieved on a silicon substrate using a 100 to 1000 Angstrom layer of nominal 80% Ni and 20% target material deposited by sputtering or other suitable methods.

Figure 3:
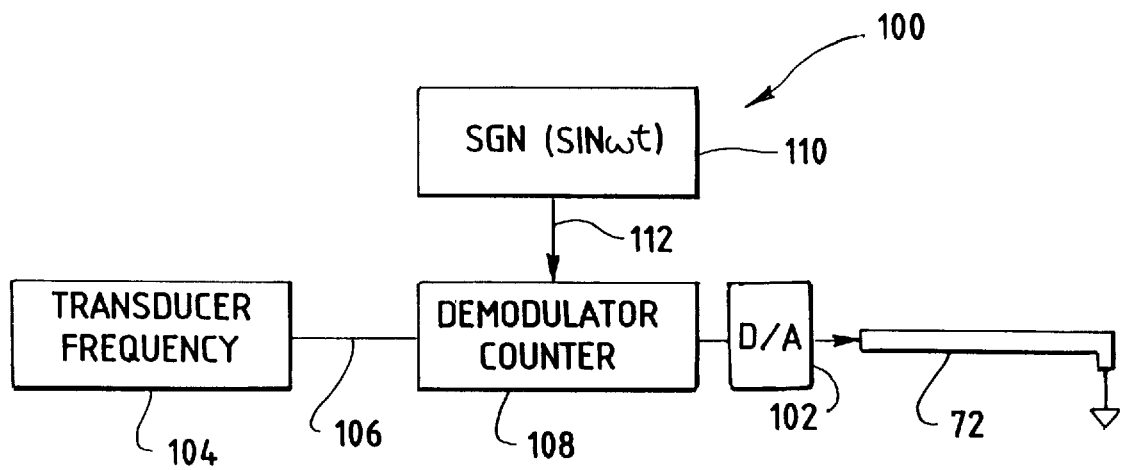
FIG. 3 is a block diagram of a misalignment signal circuit for use with the invention.

FIG. 3 illustrates, in block diagram form, a circuit 100 for generating on line 102 an analog misalignment signal which can be applied to the struts 72–78. Here, the output frequency of one of the force transducers 44 or 46, represented by a block 104, is input over a line 106 to a demodulator counter 108. Another signal, SGN(sin ωt) represented by a block 110 is applied over a line 112 to the demodulator 108. The SGN(sin ωt) signal, as more fully described in the U.S. Pat. No. 4,665,748, represents the sign of sin ωt where ω is the dither frequency. Thus, the SGN(sin ωt) signal is in effect a polarity signal that represents the relative location of the accelerometer 14 or 16 along the dither axis 20. Misalignment of the proof mass 22 or 24 will result in a change in frequency output of the transducer 44 or 46 on line 106 depending upon which side along the dither axis 20 the accelerometer 14 or 16 is moving. The demodulator 108, then, by counting the transducer frequency cycles over the positive portion of the SGN(sin ωt) signal and subtracting the number of frequency cycles over the negative portion of the SGN(sin ωt) can generate on the line 102 an analog voltage having a voltage level that corresponds to the misalignment of the proof mass 22 or 24. Depending upon the polarity of the misalignment signal on the line 102, the misalignment signal can be applied, for example, to the strut 72 or 74 of the accelerometer in order to servo the proof mass 22 into planer alignment with the dither axis 20.

The alignment technique as described above in connection with FIGS. 2 and 3 has a number of very significant advantages. First, the servo loop 100 of FIG. 3 can operate at a very low bandwidth and the power required to align the proof masses 22 and 24 is low, on the order of 10 milliwatts. Secondly, each of the proof masses 22 and 24 can be individually served to null with respect to the dither axis 20. In addition, all of the required physical structure can be fabricated on the substrate 70 along with the rest of the sensor.

In addition to the preferred method for correcting misalignment of the proof masses 22 and 24 as described above, there are a number of other methods that can be used. One such method would involve capacitively torqueing the proof masses 22 and 24 with respect to the dither axis 20. This approach might, for example, use four pads on either side of the center line of the proof masses 22 and 24 along with a servo circuit similar to circuit 100 to capacitively drive diagonal pairs of the pads to effect a torque on the proof masses 22 and 24. Another approach would be to apply a conductive path around the edges of the proof masses 22 and 24 and utilize the magnetic flux generated by the support structure to torque the proof masses 22 and 24 into alignment. By using a servo circuit similar to circuit 100, a current could be directed through the conductive path in the direction appropriate to correct the alignment of the proof masses 22 and 24. A third modification of the methods described above would involve doping the struts 72–78 with a piezo-active material. In this method, the servo circuit 100 could be used to direct a current into the piezo-active material to increase or decrease the length of the struts 72–78. Also, by plating the struts 72–74 with a magnetostrictive material the length of the struts 72–78 can be made to decrease in the presence of a magnetic field under control of a servo circuit similar to circuit 100. Another method could involve the use an indirect heating to correct the misalignment of the proof masses 22 and 24 by using a heat source to heat the struts 72–78 by convection, conduction or radiation. Alternatively to the methods described above where the struts 72–78 are mechanically elongated, it would also be possible to relocate the ends of the struts 72–78 in order to correct misalignment of the proof masses 22 and 24. For example, the ends of the struts 72–78 which are normally attached to the accelerometer frames 40 and 42 could be attached instead to flexures which in turn would be forced to move along the dither axis 20 in response to the misalignment signal 102. The source of the force causing these flexures to move can be capacitive, magnetic, piezo-active, hydraulic, pneumatic, heat or radiant.

The sensor as described above, particularly in connection with FIGS. 2 and 3, has a very significant advantage in that it makes possible a low cost inertial grade rate and acceleration sensor which can be easily manufactured. The sensor as described in connection with FIG. 1, even without a misalignment correction mechanism, would be suitable for tactical applications.

What is claimed is:

1. An angular rate sensor comprising:

a support structure;

a generally planar substrate, having an angular rate sensing axis and a dither axis normal to each other and parallel to a plane of said substrate, secured within said support structure;

a mounting frame formed in said substrate;

a first and a second accelerometer formed in said substrate wherein each said accelerometer includes an accelerometer frame, a proof mass located within said accelerometer frame, a hinge attaching a first end of said proof mass to said accelerometer frame in order to permit at least limited angular rotation of said proof mass with respect to said accelerometer frame in response to acceleration in a force sensing axis normal to the plane of said substrate wherein said first and second proof masses are located on each side of and in parallel to said angular rate sensing axis, a first strut connecting a second end of said proof mass to said accelerometer frame, and a force detector connected between said proof mass and said accelerometer frame;

a plurality of frame flexures connecting said first and second accelerometer frames to said mounting frame;

dither means for dithering said first and second accelerometers along said dither axis at a frequency ω;

processing means responsive to said first and second force detectors for generating a signal representing angular rotation of the sensor around said angular rate sensing axis, said processing means including means for generating a misalignment signal; and means, responsive to said misalignment signal, for applying an alignment force to said first and second proof masses, said alignment force aligning each of said proof masses with said dither axis.

2. The sensor of claim 1 additionally including a link formed in said substrate, said link connecting said first and second accelerometers.

3. The sensor of claim 1 wherein said first accelerometer frame is connected to said mounting frame by a first one of said frame flexures attached to a first side of said mounting frame and to a first side of said accelerometer frame and a second one of said frame flexures is attached to a second side of said mounting frame and to a second side of said accelerometer frame.

4. The sensor of claim 1 wherein said force detector of said first accelerometer includes a first force sensing transducer for measurin the angular rotation of said first proof mass relative to said first accelerometer frame and said force detector of said second accelerometer includes a second force sensing transducer for measuring the angular rotation of said second proof mass relative to said second accelerometer frame.

5. The sensor of claim 4 wherein said force sensing transducers each include dual vibrating beams.

6. The sensor of claim 4 wherein said first and said second force sensing transducers are connected to said first and second proof masses so as to provide for a push-pull operation of said force sensing transducers.

7. The sensor of claim 6 wherein said first force sensing transducer is connected to a portion of said first proof mass located toward said second end of said proof mass away from said first hinge and wherein said force sensing transducer of said second accelerometer is connected to a portion of said second proof mass located towards said second end of said proof mass away from said second hinge.

8. The sensor of claim 7 wherein said first and second force sensing transducers each include dual vibrating beams.

9. The sensor of claim 1 wherein said alignment force applying means applies said alignment force though said first struts.

10. The sensor of claim 9 wherein said alignment force applying means includes a heater for applying heat to said first struts.

11. The sensor of claim 10 wherein said beater includes current means for selectively applying an electric current to said first struts.

12. The sensor of claim 11 wherein said first struts include an epitaxial material for conducting said current.

13. The sensor of claim 11 wherein said first struts include a Ni-Cr resistor for generating heat in response to said current.

14. The sensor of claim 11 wherein said current means includes misalignment means for generating misalignment signals representing a misalignment of said first and second proof masses with said dither axis.

15. The sensor of claim 14 wherein said misalignment means is responsive to a first and a second acceleration signal generated by said first and second force detecting means respectively and a signal equal to SGN (sin ωt) where SGN represents the "sign of" and t represents time.

16. The sensor of claim 1 wherein each of said first and second accelerometers includes a second strut connecting said second end of proof masses to said first and second accelerometer frames.

17. The sensor of claim 16 wherein said first and second struts are connected to approximately the center of said second ends of said first and second proof masses.

18. The sensor of claim 17 wherein said first and second struts are substantially parallel to said dither axis and are connected to a first and second side of said first and second accelerometer frames.

19. The sensor of claim 18 wherein said alignment force applying means selectively applying a torsional alignment force trough at least one of said first and second struts to each of said proof masses.

20. An angular rate sensor comprising:

a support structure;

a generally planar substrate, having an angular rate sensing axis and a dither axis normal to each other and parallel to a plane of said substrate, secured within said support structure;

a mounting frame formed in said substrate;

a first accelerometer formed in said substrate, located within said mounting frame on a first side of said angular rate sensing axis, including a first accelerometer frame, a first proof mass located within said first accelerometer frame, a first hinge attaching a first end of said first proof mass to said first accelerometer frame to permit at least limited angular rotation of said first proof mass with respect to a plane of said first accelerometer frame in response to acceleration along a force sensing axis normal to the plane of said substrate, a first suspension member connecting a second end of said first proof mass to said first accelerometer frame and first force detector connected between said first proof mass and said first accelerometer frame;

a first frame flexure connecting said first accelerometer frame to said mounting frame;

a second accelerometer formed in said substrate, located within said mounting frame on a second side of said angular rate sensing axis, including a second accelerometer frame, a second proof mass located within said second accelerometer frame, a second hinge attaching a first end of said second proof mass to said second accelerometer frame to permit at least limited angular rotation of said second proof mass with respect to a plane of said second accelerometer frame in response to acceleration along said force sensing axis, a second suspension member connecting a second end of said second proof mass to said second accelerometer frame and a second force detector connected between said second proof mass and said second accelerometer frame;

a second frame flexure connecting said second accelerometer frame to said mounting frame;

a link formed in said substrate connecting said first accelerometer to said second accelerometer;

dither means for dithering said first and second accelerometers along said dither axis at a frequency ω;

processing means responsive to said first and second force detecting means and said dither means for generating an angular rotation signal representing the angular rotation of the sensor around said angular rate axis, and a misalignment signal; and means, coupled to receive said misalignment signal, for selectively applying an alignment force in response to said misalignment signal to each of said first and second proof masses, said alignment force aligning each of said first and second proof masses along said dither axis.

21. The sensor of claim 20 wherein each of said first and second suspension members includes a first strut and second strut each of which are connected to said second ends of said first and second proof masses and to said first and second accelerometer frames, respectively.

22. The sensor of claim 20 wherein said first and second hinges are disposed toward a first side of said mounting frame.

23. The sensor of claim 21 wherein said alignment force applying means applies said alignment force through at least one of said first and second members.

24. The sensor of claim 23 wherein said alignment force applying means increases a length of at least one of said first and second struts to create said alignment force.

25. The sensor of claim 24 wherein said alignment force applies heat to at least one of each of said first and second struts to increase the length of said heated struts.

26. The sensor of claim 25 wherein said alignment force applying means is responsive to said first and second force detector and said dither means to generate a misalignment signal and wherein said heat is applied to said a struts in response to said misalignment signal.

27. The sensor of claim 20 wherein said substrate is composed of silicon.

28. The sensor of claim 23 wherein said first and second hinges are disposed toward a first side of said mounting frame.

29. The sensor of claim 28 wherein said first and second force detectors include a dual vibrating beam force transducers first and second proof masses and said first and second accelerometer frames.

30. A sensor comprising:

a support structure;

a mounting frame secured in said support structure;

a first planar proof mass;

first suspension means including a first hinge for connecting said first proof mass to said mounting frame such that a plane of said proof mass is generally maintained parallel to both a first axis and a second axis which are normal to each other and is permitted by said hinge at least limited angular rotation with respect to said first axis in response to acceleration along a force sensing axis normal to both said first axis and said second axis;

alignment force applying means for applying a first alignment force to said first proof mass through said first suspension means to maintain said proof mass in planar alignment with said second axis; and wherein said alignment force applying means includes a first misalignment signal means for generating a first misalignment signal and wherein said alignment force applying means generates said first alignment force in response to said first misalignment signal.

31. The sensor of claim 30 wherein said first suspension means includes a first strut member and said alignment force means applies said first alignment force through said first strut member to said first proof mass.

32. The sensor of claim 31 wherein said alignment means applies said first alignment force to said proof mass by increasing a length of said first strut member.

33. The sensor of claim 32 wherein said alignment force applying means applies heat to said first strut member to increase length of said first strut member.

34. The sensor of claim 31 wherein the sensor includes a dither means for dithering said first proof mass along said second axis at a frequency ω and a first force detecting means for measuring the angular rotation of said first proof mass and wherein said first misalignment signal means is responsive to both said dither means and said first force detecting means for generating a first misalignment signal and wherein said alignment_force applying means generates said first alignment force in response to said first misalignment signal.

35. The sensor of claim 31 wherein said sensor includes a second planar proof mass, a second suspension means including a second hinge and a second strut member for connecting said second proof mass to said mounting frame and for generally maintaining said second proof mass in parallel with both said first axis and said second axis and permitting said second proof mass to angularly rotate with respect to said first axis in response to acceleration along said force sensing axis and wherein said alignment means applies a second alignment force though said second strut member to said second proof mass to maintain said second proof mass in p alignment with said second axis.

36. The sensor of claim 35 wherein said sensor is an angular rate sensor and includes dither means for dithering said first and second proof masses along said second axis, first and second force detecting means for generating first and second output signals measuring the angular rotation of said first and second proof masses respectively and wherein said sensor includes processing means responsive to said dithering means and said first and second force detecting means for generating a rate signal representing the angular rotation of the sensor around said first axis.

37. The sensor of claim 36 wherein said first and second proof masses are configured out of silicon.

38. The sensor of claim 36 wherein said first and second force detecting means are connected to said first and second proof masses in a push-pull arrangement.

39. The sensor of claim 36 wherein said first and second proof masses are dithered at a frequency ω and said alignment force applying means generates said first and second alignment forces as a function of ω and the output signals of said first and second force detecting means.

40. The sensor of claim 39 wherein said alignment force applying means includes a demodulator for demodulating said first and second output signals as a function of SGN(sin ωt) to produce a first and second misalignment signal which respectively generate said first and second alignment forces.

* * * * *